(12) United States Patent
Kaji (10) Patent No.: US 8,757,808 B2
(45) Date of Patent: Jun. 24, 2014

(54) PROJECTOR HAVING LIGHT EMISSION DEVICES

(75) Inventor: Nobuaki Kaji, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 13/213,694

(22) Filed: Aug. 19, 2011

(65) Prior Publication Data

US 2012/0044462 A1   Feb. 23, 2012

(30) Foreign Application Priority Data

Aug. 20, 2010   (JP) ................... 2010-184503

(51) Int. Cl.
*G03B 21/00*   (2006.01)

(52) U.S. Cl.
USPC ............................................. 353/31

(58) Field of Classification Search
USPC .................... 353/30, 31; 30/30, 31
See application file for complete search history.

(56) References Cited

U.S. PATENT DOCUMENTS

| 2006/0215122 | A1* | 9/2006 | Hong | 353/31 |
| 2008/0143972 | A1* | 6/2008 | Matsumoto et al. | 353/31 |
| 2010/0128227 | A1* | 5/2010 | Huang et al. | 353/33 |

FOREIGN PATENT DOCUMENTS

| JP | 6-244506 A | 9/1994 |
| JP | 2006-91257 A | 4/2006 |
| JP | 2006-126644 A | 5/2006 |
| JP | 2006-337609 A | 12/2006 |
| JP | 2006-349731 A | 12/2006 |
| JP | 2007-171364 | 7/2007 |
| JP | 2008-83538 A | 4/2008 |
| JP | 2008-261998 A | 10/2008 |
| JP | 2008-276209 | 11/2008 |
| JP | 2009-58594 A | 3/2009 |
| JP | 2010-169754 | 8/2010 |
| JP | 2010-197951 | 9/2010 |
| JP | 2010-197953 | 9/2010 |

OTHER PUBLICATIONS

Japanese Office Action Issued Dec. 10, 2012 in Patent Application No. 2010-184503 (with English translation).

\* cited by examiner

*Primary Examiner* — Thanh Luu
(74) *Attorney, Agent, or Firm* — Oblon, Spivak, McClelland, Maier & Neustadt, L.L.P.

(57) ABSTRACT

An aspect of the present embodiment, there is provided a projector, including a first optical source fixed on a first mount substrate, the first optical source emitting a first light, a second optical source fixed on the first mount substrate being apart from the first optical source for a first distance, the second optical source emitting a second light, a third optical source fixed on a second mount substrate, the third optical source emitting a third light, an emission period of the third light being set between an emission period of the first light and an emission period of the second light.

10 Claims, 7 Drawing Sheets

PROJECTOR HAVING LIGHT EMISSION DEVICES

CROSS REFERENCE TO RELATED APPLICATION

This application is based upon and claims the benefit of priority from prior Japanese Patent Application No. 2010-184503, filed on Aug. 20, 2010, the entire contents of which are incorporated herein by reference.

FIELD

Embodiments described herein generally relate to a projector.

BACKGROUND

Optical technology using space light modulator such as DMD (Digital Micro mirror Device) or the like have been used in a projector.

In digital light processing, for example, a DMD includes a plurality of micro mirrors which are arranged as an array. The DMD is irradiated with light and the reflection light from the DMD is enlarged by lens or the like to be projected, so that an image is displayed. Conventionally, white light from an irradiation lump or the like as an optical source is injected into a color foil with a circular shape to be separated in this method. Color filters with red (R), green (G) or blue (B), respectively, are arranged in the color foil. The color light separated by the mirror in the DMD is transformed in order into a color image. In this step, the color light is driven in time division with synchronization to a rotation of a color foil.

In the projector, lifetime, deterioration, exothermic, consumption power or the like are pointed out as an important problem. Further, downsizing or the like of the optical source has also been demanded. Recently, semiconductor emission elements with RGB colors, for example, an emission diode, laser diode or the like have been used instead of irradiation lumps. Therefore, downsizing of the semiconductor emission elements has been developed.

Especially, when a semiconductor emission element is installed in a projector with a volume disposed on a hand or put in a pocket for carrying with convenience, it has been desired to product not only downsizing of the optical source but a semiconductor emission element with high emission.

Furthermore, it has been expected by downsizing to extend to application to a small desktop-type projector, back projection-type TV or the like, for example, other than a digital handy assistance, a cell phone, a PC or the like, for example.

DETAILED DESCRIPTION

An aspect of the present embodiment, there is provided a projector, including a first optical source fixed on a first mount substrate, the first optical source emitting a first light with first color, a second optical source fixed on the first mount substrate being apart from the first optical source for a first distance, the second optical source emitting a second light with second color, a third optical source fixed on a second mount substrate, the third optical source emitting a third light with a third color, an emission period of the third light being set between an emission period of the first light and an emission period of the second light, a space optical modulation unit modulating the first light, the second light and the third light, and outputting modulated light as an image, a first optical system introducing the first light, the second light and the third light into the space optical modulation unit, and a second optical system projecting the image.

(Embodiment)

Embodiments are described below in detail with reference to the attached drawings mentioned above. Throughout the attached drawings, similar or same reference numerals show similar, equivalent or same components.

A projector according to an embodiment will be described below in detail with reference to FIGS. 1-7.

Figure 1:
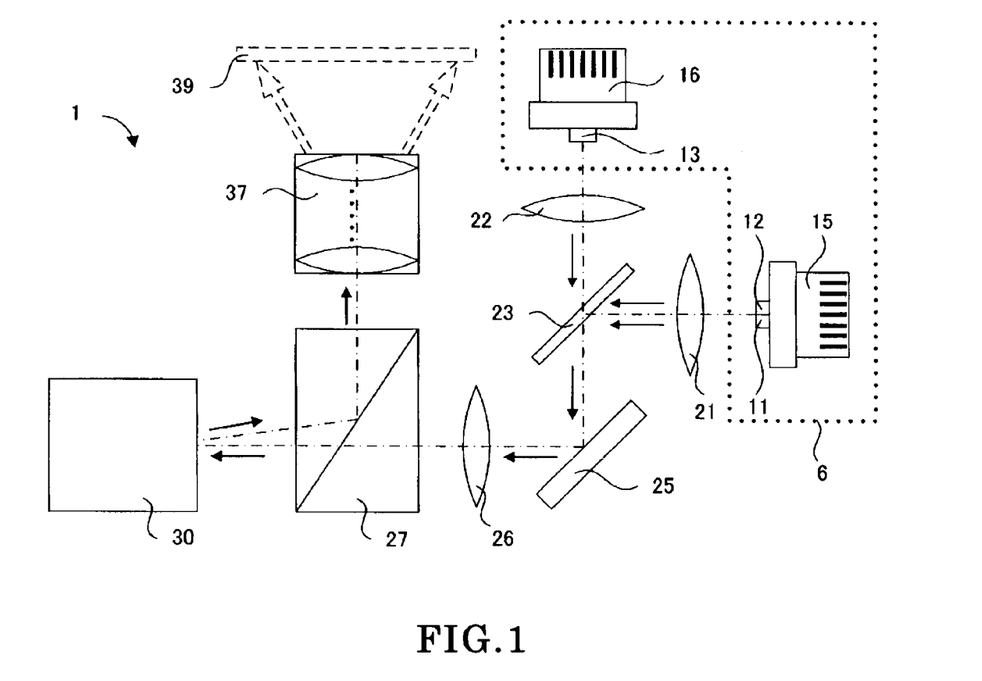
FIG. 1 is a schematic view showing a constitution of a projector in an embodiment.

As shown in FIG. 1, a projector 1 includes a projector light source 6 and a spatial light modulation unit 30. The projector light source 6 emits three primary colors of light. The spatial light modulation unit 30 modulates light. Each light of the three primary colors emitted from the projector light source 6 is modulated to an output image which is corresponding to an image signal, and the light is emitted through a projection lens 37. The light emitted from the projector light source 6 is introduced into the spatial light modulation unit 30 through a first optic system. The light reflected in the spatial light modulation unit 30 is introduced into the projection lens 37 through a second optic system.

The projector 1 includes a control unit (not shown). The control unit controls emission of the projector light source 6 and modulation of the spatial light modulation unit 30. An electrical image signal is input into the control unit, so that the projector light source 6 is advanced to be emitted. In other words, the projector light source 6 is driven, so that the output image is generated corresponding to the image signal in the spatial light modulation unit 30.

In the projector light source 6, LED 11 and LED 12 (Light Emission Diode) are provided on amount substrate 15 called a first mount substrate. The LEDs 11, 12 are a first optical source and a second optical source in the three primary colors of light, respectively, and are adjacently fixed to each other. The LED 11, for example, is composed of a material in GaN-series, and emits blue light. A chip of the LED 11 has a 750 μm square of an area. The LED 12 is composed of a material in GaN-series, and emits green light. A chip of the LED 12 has a 750 μm square of an area. In the projector light source 6, LED 13 is provided on a mount substrate 16 called a second mount substrate. The LED 13 is composed of a material in GaAlAs-series, for example, which is different from those of LEDs 11, 12, and emits red color. A chip of the LED 13 has a 750 μm square of an area.

Figure 2:
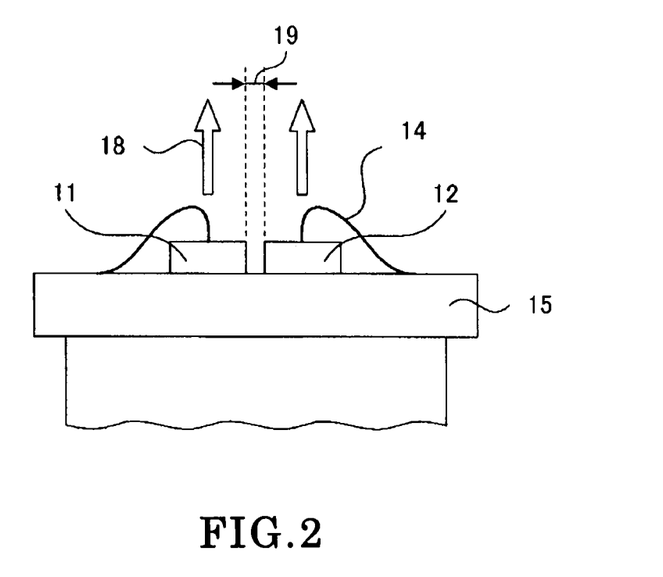
FIG. 2 is a schematic view showing an optical source of the projector in the embodiment.

As shown in FIG. 1, the LEDs 11, 12 are fixed on the mount substrate 15 with a radiator fin by a mounting material (not shown). Both the radiator fin composed of an Al and a mounting material has good thermal conductivity. As shown in FIG. 2, a distance between the LED 11 and LED 12 is set to be nearly 50 μm (0.05 mm). A relationship between thermal influence and a distance between the chips is described after. In FIG. 2, an encapsulation resin, the radiator fin and the like are omitted.

In each of the LEDs 11, 12, one electrode (not shown) is connected to a wiring (not shown) on the mount substrate 15, and the other electrode (not shown) is connected to another wiring (not shown) via a gold wire 14 on the mount substrate 15. Each of the LEDs 11, 12 can be independently emitted. Each emission light 18 of the LEDs 11, 12 is nearly perpendicularly to the mount substrate 15.

As shown in FIG. 1, the LED 13 is fixed on the mount substrate 16 with the radiator fin by a mounting material (not shown). Both the radiator fin composed of an Al and a mounting material has good thermal conductivity. The constitution of the LED 13 is similar to those of the LEDs 11, 12.

Each emission light 18 from the LEDs 11, 12 is nearly perpendicularly to the emission light from the LED 13. A dichroic mirror 23 is provided at a position which is crossed with both nearly 45 degrees to an optical axis of the emission light from the LEDs 11, 12 and nearly 45 degrees to an optical axis of the emission light from the LED 13. A collimator lens 21 is provided between the LEDs 11, 12 and the dichroic mirror 23, and a collimator lens 22 is provided between the LED 13 and the dichroic mirror 23.

The blue light and the green light from the LED 11 and the LED 12, respectively, are adjusted as nearly collimated light by the collimator lens 21. The red light from the LED is adjusted as nearly collimated light by the light collimator lens 22. The blue light and the green light passed in the collimator lens 21 are reflected by the dichroic mirror 23. The red light passed through the collimator lens 22 is transmissive in the dichroic mirror 23. The blue, green and red lights are adjusted to the same direction along the optical axis represented as the dashed-dotted line by the dichroic mirror 23. Timing on the emission of the blue, green and red light are described after.

A mirror 25 is provided to cross with nearly 45 degrees to the light through the dichroic mirror 23. The mirror 25, field lens 26, inner total reflection prism 27 and the spatial light modulation unit 30 in order are provided along the light direction. The light runs in nearly a straight line.

All of the lights along the optical axis are reflected by the mirror 25, are focused by the field lens 26, are transmissive in the inner total reflection prism 27, and are irradiated into the spatial light modulation unit 30.

Figure 3:
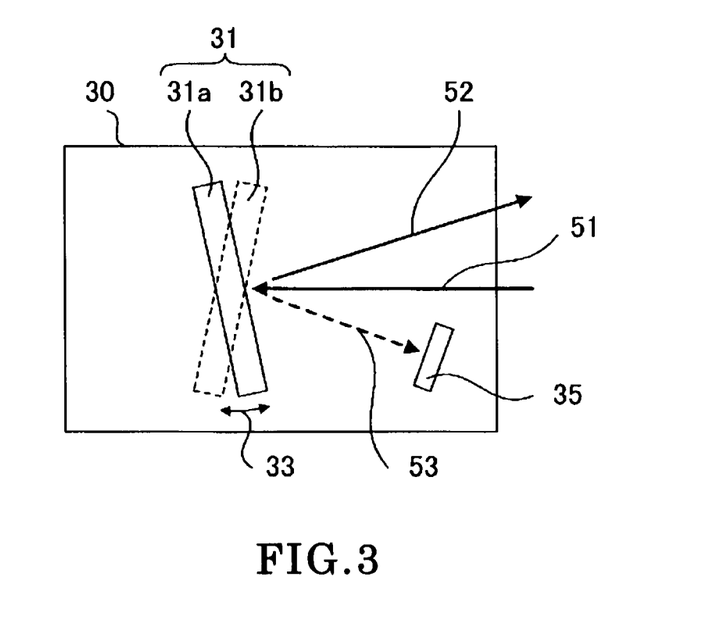
FIG. 3 is a schematic view showing a spatial light modulation unit of the projector in the embodiment.

The spatial light modulation unit 30 includes a DMD in which a plurality of micro mirrors arranged as an array. Each of the micro mirrors is corresponded to each of image elements. The micro mirror 31 arranged in the DMD is shown in FIG. 3. A rotation angle 33 of the micro mirror 31 is set to be twenty-four degrees, for example. The micro mirror 31 can be shifted to one position 31a or another position 31b represented as the dashed line by the rotation.

When the micro mirror 31 in the spatial light modulation unit 30 is set at the position 31a, an irradiation light 51 is reflected to a direction of the inner total reflection prism 27. In other words, a reflection light 52 reflected along an optical axis of the irradiation light 51 is returned towards a direction to the inner total reflection prism 27 with twenty-four degrees. On the other hand, when the micro mirror 31 is set at the position 31b, a reflection light 53 to the irradiated light 51 is reflected to a stopper 35 which is out of the direction of the inner total reflection prism 27. After that, the light is not contributed to form the output image. The position of the micro mirror 31 and time retained at the position is selected by the control unit.

The position and time of the micro mirror 31 are selected by every blue, green, red lights. In such a manner, hue, light amount (brightness) and the like of the output image are determined. Each micro mirror included in the DMD is identically controlled, so that the output image is two-dimensionally generated.

The reflection light from the spatial light modulation unit 30 becomes the output image. The reflection light is reflected to the direction of the projection lens 37 at an inner boundary plane of the inner total reflection prism 27. Further, the reflection light is enlarged by the projection lens 37 on the optical axis, and is projected on a screen 39. The screen 39 is set as an outer unit of the projector 1 and constitutes a projection plane.

Figure 4A:
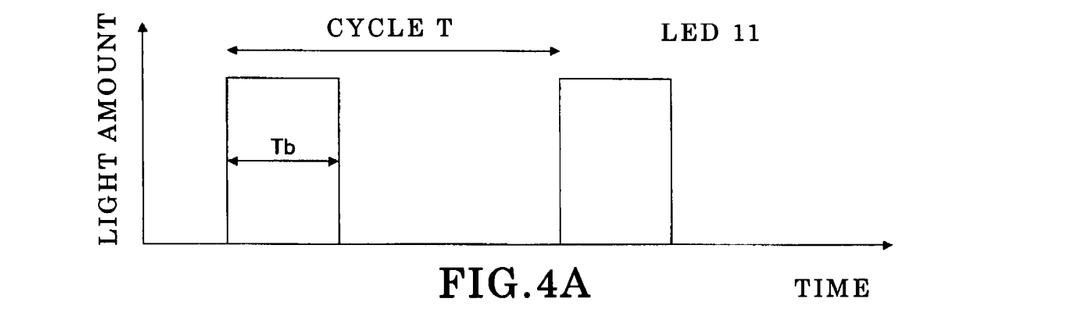
FIG. 4 is a schematic view showing timing on driving the optical source of the projector in the embodiment.
Figure 4B:
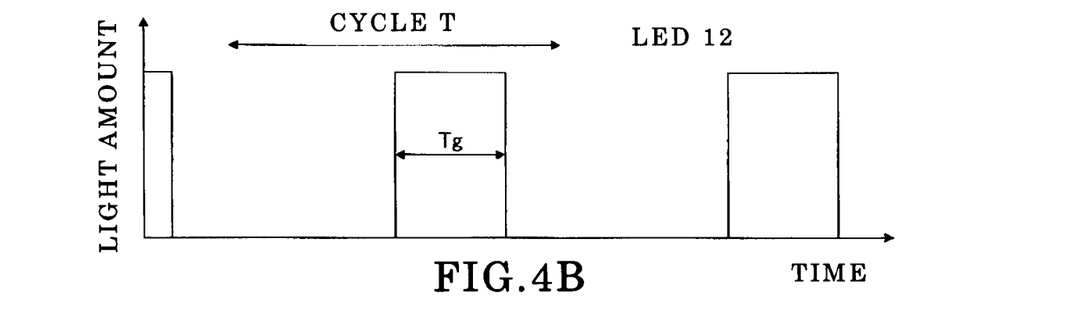
Figure 4C:
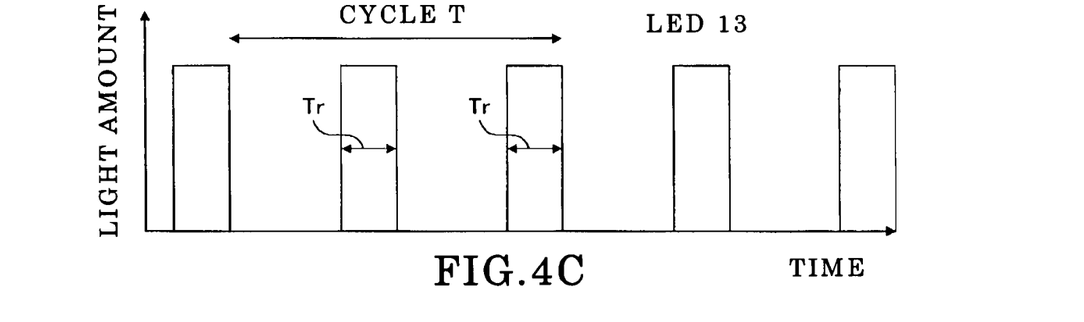

Timing on emission of each of the blue, green, red lights in the projector light source 6 is described. FIGS. 4A-4C show emission time dependence of light amounts of the LEDs 11, 12 and 13 in an arbitrary scale, respectively. As shown in FIG. 4A, a cycle of T second is constituted with a blue emission (emission time Tb second), a red emission (emission time Tr second), a green emission (emission time Tg second), and the red emission (emission time Tr second). The red emission is sandwiched between the blue emission and the green emission which are fixed on the same mount substrate 15. Each of the LEDs 11, 12, 13 can be arbitrarily selected as the start emission light or the finish emission light. Accordingly, the start and the finish of the emission are not restricted.

The cycle T can be ideally represented as equation (1).

$$T = Tb + Tr + Tg + Tr \tag{1}$$

On the other hand, non-emission time can be set between two emissions in the LEDs 11, 12, 13 to avoid a mixed color. When the non-emission time To is set, for example, the cycle T can be represented as equation (2).

$$T = Tb + To + Tr + To + Tg + To + Tr + To \tag{2}$$

The cycle T is set 10 ms (100 Hz), for example. On the other hand, The cycle T can be set 20 ms or smaller (50 Hz or larger) to decrease light flicker. The emission times Tb, Tg, Tr can be determined to output a desirable image on the basis of emission characteristics of each LED.

The LED 13 includes two emission times Tr in one cycle. Each of the emission times Tr has the same period. On the other hand, the two emission times Tr can be respectively adjusted on the basis of an exothermic amount of the emissions of the LED 11, 12 which are disposed on the same mount substrate 15. Immediately after one LED (LED 11 or LED 12) which has a larger exothermic amount is emitted, the LED 13 emits the red light with an emission time Tr1 which has a larger exothermic amount. Immediately after the other LED which has a smaller exothermic amount is emitted, the LED 13 emits the red light with an emission time Tr2 which has a smaller exothermic amount than the emission time Tr1. adjusting the emission time of the LED 13 can lead that temperatures of the LED 11 and the LED 12 immediately before the emission are constantly retained.

As mentioned above, the emissions of the LEDs 11, 12, 13 can be continuously emitted with the emission times Tb, Tg, Tr in applying continuously current. On the other hand, the emissions of the LED 11, 12, 13 may be emitted with pulse emissions in applying pulse current. The pulse emission is a method for applying larger current in shorter time as compared to the continuous emission. Accordingly, a peak of the light amount can be set to be larger. Larger current causes larger exothermic amount. On the other hand, longer non-emission time To is enable to repeat the pulse emission. In the pulse emission, the red emission other than the start and the stop of the emission from the LED 13 fixed on mount substrate 16 is necessarily sandwiched between the blue emission from the LED 11 and the green emission from the LED 12, where the LED 11 and the LED 12 are fixed on the same mount substrate 15. The continuous emission or the pulse emission can be selected in a specification or the like of the projector 1.

As mentioned above, the projector 1 includes the LEDs 11, 12 which are adjacently fixed to each other on the mount substrate 15 and the LED 13 fixed on the mount substrate 16 as the projector light source 6. Each of the LEDs 11, 12, 13 emits different light in three primary colors. At least one of the LEDs 11, 12 on the same mount substrate 15 emits immediately after the emission of the LED 13 is finished other than the start and the stop of the emission.

A relationship between a LED chip distance and heat phenomena is described below. Injected electric power into the LED is changed into heat other than light emission. The heat increases the LED temperature, and decreases emission characteristics of the LED, for example, brightness (light flux). Further, the heat with respect to the emission of the LED heats up the adjacent LED.

Figure 5:
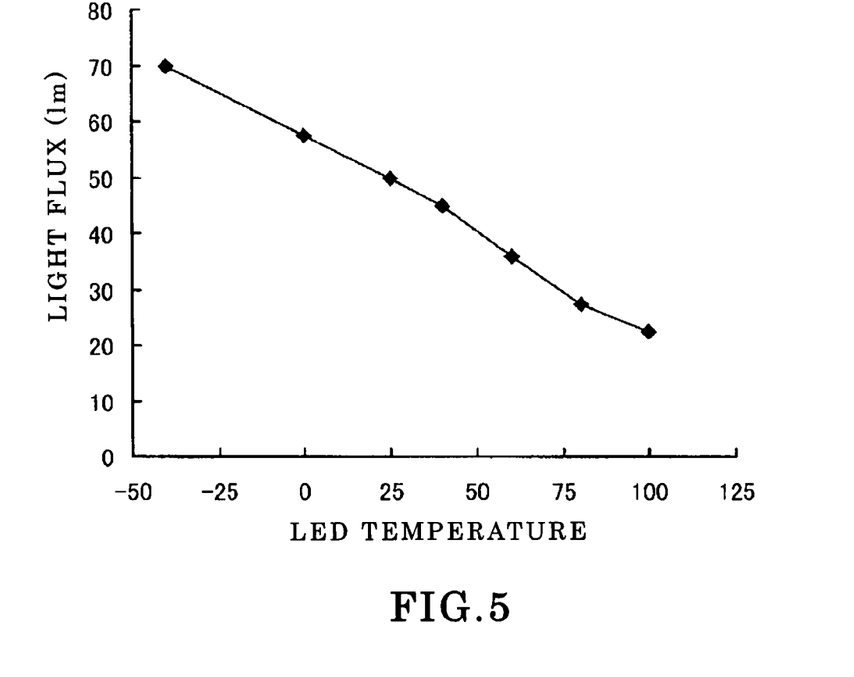
FIG. 5 is a schematic view showing temperature characteristics on driving an LED of the optical source in the embodiment.

LED temperature (deg C) as the horizontal axis and light flux (lm) emitted from the LED as the vertical axis are shown in FIG. 5. For example, driving current of the LED is 350 mA. The light flux, which means the emission amount of the LED, is decreased with increasing the temperature. The brightness of the projector 1, which means the light amount of the LED, is decreased with decreasing the emission amount of the LED. It is revealed that the increase of the LED temperature by driving the LED is suppressed as least as possible for retaining the brightness of the projector 1 as higher.

Therefore, the radiator fin is provided in the mount substrate to efficiently remove the heat of the LED, such that increasing the LED temperature can be suppressed. When the LED temperature is preferentially suppressed without consideration of a volume of the projector, each of the LEDs can be individually fixed on the mount substrate.

However, in case of down-sizing a projector, one of solutions is that three LEDs are fixed on two mount substrates. Conventionally, when the two LEDs are fixed on the same mount substrate and the two LEDs emitted in order, the two LEDs are on the mount substrate continuously emitted with exothermic. The amount of emission of the one LED emitted secondly is remarkably decreased due to the temperature increase by heat dissipation of firstly emission of the other LED. Radiation by the radiator fin or the like can insufficiently remove the heat, so that a part of which is remained.

Figure 6:
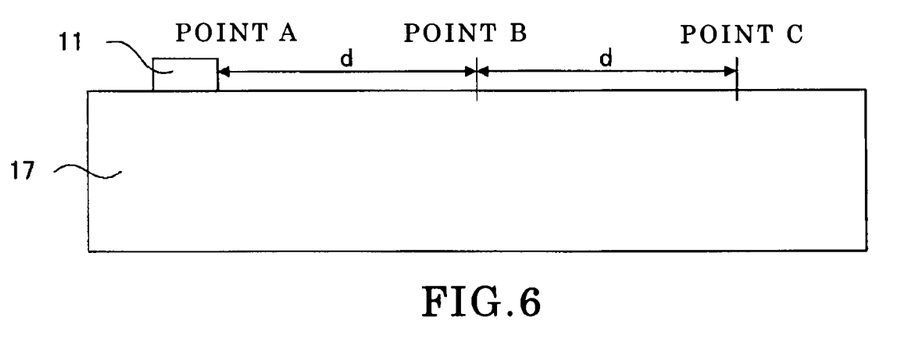
FIG. 6 is a schematic view showing a distance of each of positions from the LED of the optical source in the embodiment.

A relationship between a distance of the LED chips and the LED temperature is described. As shown in FIG. 6, a case including three points is considered where the three points are a point A as exothermic source, LED 11, for example, a point B positioned apart from the LED 11 for thermal diffusion length d, and a point C positioned apart from the exothermic source on extended line from the point B for twice of thermal diffusion length d. Here, the thermal diffusion length d represents a distance when amplitude of the LED temperature is decreased to 1/e. The thermal diffusion length d is a standard distance when heat intermittently driven from the exothermic source conducts in cyclic. The LED 11 is fixed by an A1 member 17 which is composed of the same material with good thermal conductivity as the mount substrates 15, 16.

The thermal diffusion length d is represented by equation (3).

$$d = \sqrt{\alpha/(\pi \times f)} = \sqrt{\alpha \times Ta/\pi} \quad (3)$$

Where α is thermal diffusion coefficient (mm²/sec) of the media (A1 member 17), f is cycle (Hz) of the exothermic source, namely, an emission number per one second of the exothermic source (LED 11) cycle driven by time Ta which equals to 1/f.

Figure 7A:
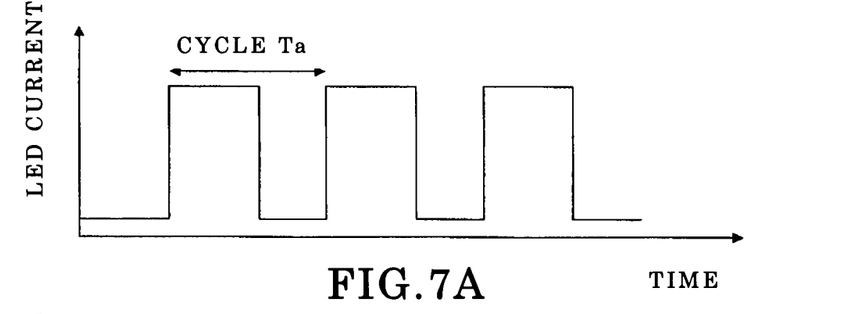
FIG. 7 is a schematic view showing thermal conductance of the LED of the optical source in the embodiment.
Figure 7B:
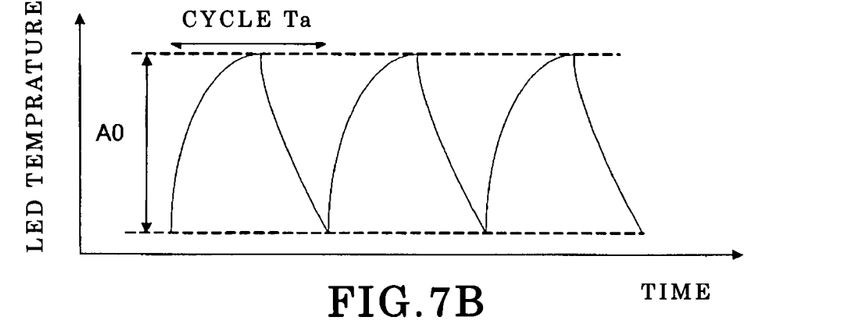
Figure 7C:
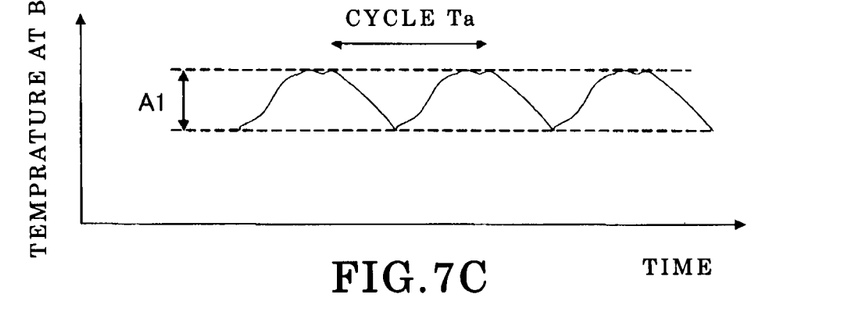

As shown in FIGS. 7A-7C, common time is set as the horizontal axis, driven current, LED temperature and temperature of point B are set as the vertical axis in FIGS. 7A-7C, respectively. Here, a relationship between exothermic source (point A) and the temperature of the point B in FIG. 6 is shown in FIG. 7. As shown in FIG. 7, for example, duty ratio of the emission is nearly 60%.

As shown in FIG. 7B, the temperature of the LED 11 as the exothermic source is rapidly increased when the current is applied. After that, the temperature approaches a saturation value. The temperature of the LED 11 is increased till the current is off. When the current is off, the temperature of the LED 11 is rapidly decreased. In mid-way of the downward, the temperature of the LED 11 restarts to be increased due to next emission. The temperature of the LED 11 is set to repeatedly be nearly the constant maximum temperature and nearly the constant minimum temperature in the cycle Ta. A difference A0 between the maximum temperature and the minimum temperature becomes a fluctuation range which indicates the amplitude.

As shown in FIG. 7C, the temperature of the point B start to be increased after a period has been passed from the point which applying current in the LED 11 and increasing the temperature of the LED 11 as the exothermic source was finished. After that, the temperature of the point B is set to repeatedly be nearly the constant maximum temperature and nearly the constant minimum temperature in the cycle Ta with retaining the time difference. A temperature difference A1 between the maximum temperature and the minimum temperature becomes a fluctuation range which is smaller than the fluctuation range A0. The temperature variation indicates a gradual slope in upward and downward.

As mentioned above, a relationship between the fluctuation range A0 of the temperature of the LED as the exothermic source and the fluctuation range A1 at the point B due to the LED temperature is represented by equation (4).

$$A1/A0 = 1/e \text{ (nearly 37\%)} \quad (4)$$

As similarly, a relationship between the fluctuation range A1 at the point B due to the LED temperature and the fluctuation range A2 at the point C due to the LED temperature is represented by equation (5).

$$A2/A1 = 1/e \quad (5)$$

Consequently, a relationship between the fluctuation range A0 and the fluctuation range A2 is represented by equation (6).

$$A2/A0 = 1/e^2 \text{ (nearly 14\%)} \quad (6)$$

An influence on time dependence of the exothermic source (LED) is smaller when the distance between the exothermic source and the point is larger.

The equation (6) indicates that the thermal influence of the LED emission on the temperature of the point B is negligibly small in practical use. In other wards, when the cycle and the thermal output in time average are the same in LEDs, the thermal influence due to a deference of a modulation approach between the LEDs is a rare case at a position apart from the LED for the twice period.

When thermal diffusion coefficient of the A1 member is 97 mm$^2$/sec, the LED driving frequency is 100 Hz, and thermal diffusion length d is nearly 0.56 mm. When the distance between the LED 11 and the LED 12 is set to be below twice of the thermal diffusion length d in an experiment of the projector 1, the fluctuation range of the temperature strongly affects on the temperature of LED 12. The experiment can confirm that the thermal interference between the LEDs becomes larger and not negligibly-small. Accordingly, downsizing as a solution on the projector 1, for example, has been pursued as a first priority. Further, higher performance, lower cost or the like has been also pursued. As a result, the distance 19 between the LED 11 and the LED 12 is set to be nearly 0.05 mm as a good constitution according to this embodiment. The distance is corresponded to nearly one-tenth of the thermal diffusion length d and the thermal interfere between the LED 11 and the LED 12 is larger than the case in which the distance between the LEDs is about 2×d i.e. 1.02 mm.

As a result, after the emission with exothermic in LED 11 is off, the LED 13 fixed on another mount substrate 16 emitted as the projector light source 6 in the projector 1. Consequently, heat generated from the LED 11 can be diffused through the mount substrate 15, the radiator fin and the like in the emission of the LED 13. The adjacent LED 12 which is heated can be retained at lower temperature as compared to a conventional case in which the LED 11 and the LED 12 are sequentially emitted without the time where neither the LED 11 nor the LED 12 is on. As the emission of the LED 12 start at lower temperature, decrease of light power of the LED becomes smaller.

Further, after the emission of the LED 12 with exothermic is off, the emission of the LED 13 fixed on the mount substrate 16 is driven sequentially. Therefore, the same thermal radiation performs to be able to suppress decrease of emission on the LED 11. As a result, the projector 1 can have both downsizing and higher light amount. Further, when brightness is retained as a conventional case, consumption power of the projector light source 6 can be decreased.

Figure 8:
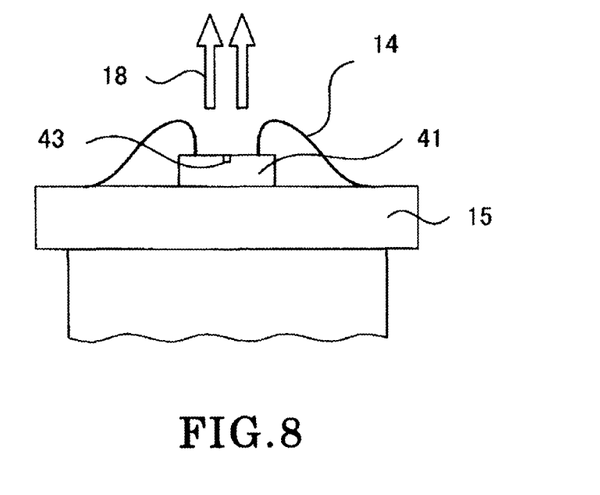
FIG. 8 is a schematic view showing a constitution of a projector in a modification.

A method for driving a projector light source according to a first modification will be described below in detail with reference to FIG. 8. It is different from the embodiment that two LED are monolithically provided on the same mount substrate of a projector light source. Each of the two LED has different wavelength each other. In FIG. 8, similar or same reference numerals show similar, equivalent or same components.

As shown in FIG. 8, the LED with two wavelengths 41 is fixed on the same mount substrate 15 as the embodiment. The LED with two wavelengths 41 includes an LED emission units (not shown), each of which emits light with a different wavelength, for example, blue or green, is monolithically provided on the same GaN-series semiconductor. The two LED emission units are isolated by an element isolation region 43, for example, a groove or an insulator. One electrode (not shown) of each LED with two wavelengths 41 is commonly provided on the back surface. On the other hand, another electrode (not shown) is individually provided on the emission surface (not shown) with respect to each color, blue or green, and is connected to a wiring on the mount substrate 15 by the gold wire 14.

Other components of the LED with two wavelengths 41 are constituted with the same as the LEDs 11, 12. A distance between the two emission lights 18 is shorter than the distance between the LEDs 11, 12. The two emission lights 18 are not necessary to be mounted individually on the mount substrate 15, which leads to diminish a mounting error. Consequently, a direction of each emission light 18 can be much aligned. Other than replacing the LEDs 11, 12 with the LED with two wavelengths 41 is the same as the projector 1 of the embodiment including driving timing of the projector light source 6.

The projector in the first modification includes the same effects as the projector 1 in the embodiment. As another effect, the two emission lights 18 emitted from the LED with two wavelengths 41 have a smaller emission point with respect to the colors. As a result, the direction of each of the two emission lights 18 can be aligned by the collimator lens 21. A ratio adjusted to parallel light becomes higher. Accordingly, the emission light can be effectively contributed to an output image.

Figure 9A:
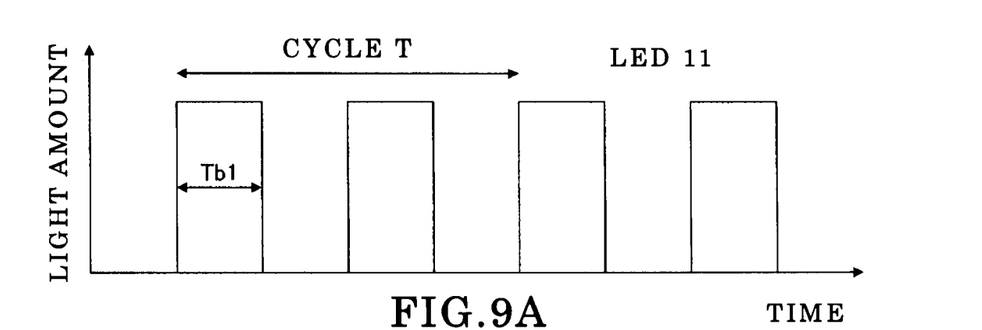
FIG. 9 is a schematic view showing timing on driving an optical source of the projector in the modification.
Figure 9B:
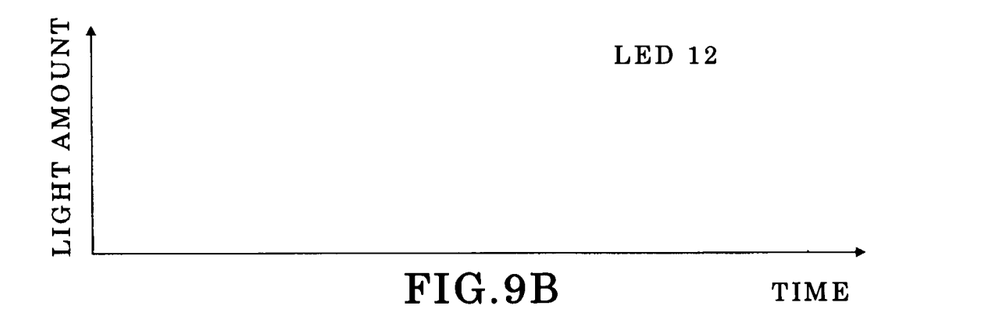
Figure 9C:
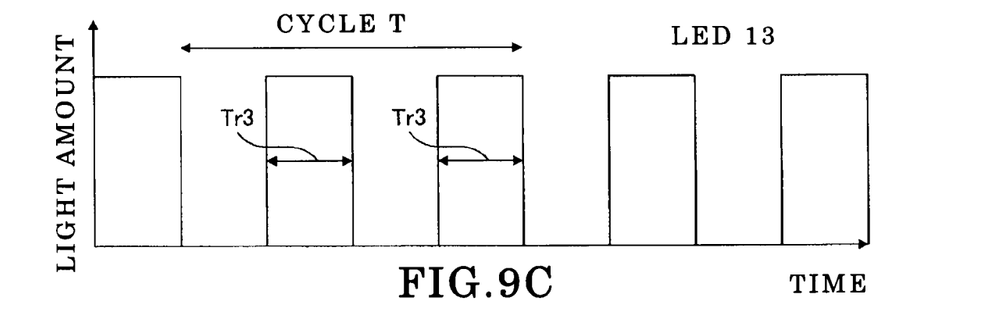

A driving method of an optical source in a second modification of the embodiment will be described with reference to FIG. 9. The second modification has a different driving timing on the optical source in the projector from that in the embodiment. In FIG. 9, similar or same reference numerals show similar, equivalent or same components.

A constitution of a projector in the second modification is the same as that of the embodiment. As shown in FIG. 9, a cycle of T second is constituted with a blue emission (emission time Tb1 second), a red emission (emission time Tr3 second), a blue emission (emission time Tb1 second), and the red emission (emission time Tr3 second). The red emission is sandwiched between the blue emissions which are emitted from the LED 11 fixed on the mount substrate 15. The LED 12 is absent on the emission. In the manner described above, the emissions are corresponding to a case where color of an output image is composed of LEDs 11, 13 in a prescribed period. The emission times Tb1 and Tr3 are shorter and longer than the emission times Tb and Tr, respectively, to balance the hue between LEDs 11, 13. The emission times Tb1 and Tr3 in the cycle T are nearly 1.5 times and 3 times, respectively.

As similar fashion, the LED 12 can be absent on the emission where color of the output image is composed of LEDs 12, 13 in a prescribed period. Further, the approach described above can be applied to change the LED 11, 12 into the LED 41 as the first modification. In such a manner, a non-emission time can be provided between the emission time Tb and the emission time Tg.

The projector in the second modification includes the same effects as the projector 1 in the embodiment. As another effect, brightness can be increased in the projector in the second modification when the hue of the output image is fixed in a constant period. The current of the projector light source can be decreased to lower the consumption power when brightness is not necessary to be increased.

In the embodiment, three LEDs are fixed on the two mount substrates, for example. On the other hand, three LEDs can be fixed on one mount substrate. In this case, the first LED and the second LED are arranged with a smaller distance to the thermal diffusion length, and the third LED is apart from the first LED and the second LED for a larger distance between the first LED and the second LED. Thermal interference between each other can be established due to the larger distance to thermal diffusion length. The first optic system can be changed from the embodiment to another fashion to effectively adjust to parallel light emitted from the first, second and third LEDs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A projector, comprising:
a first optical source fixed on a first mount substrate, the first optical source emitting a first light with first color;
a second optical source fixed on the first mount substrate being apart from the first optical source for a first distance, the second optical source emitting a second light with second color;
a third optical source fixed on a second mount substrate, the third optical source emitting a third light with a third color, an emission period of the third light being set between an emission period of the first light and an emission period of the second light;
a space optical modulation unit modulating the first light, the second light and the third light, and outputting modulated light as an image;
a first optical system introducing the first light, the second light and the third light into the space optical modulation unit; and
a second optical system projecting the image, wherein
both the emission periods of the first light and the second light are set immediately before or immediately after the emission period of the third light,
all of the first light, the second light and the third light emit in one cycle, and each of the emission periods of the first light and the second light is one time and the emission periods of the third light is two times in the cycle,
one of the third lights having a longer emission period in the two emission periods is emitted after an emission having a larger exothermic amount in the first light and the second light is performed.

2. The projector of claim 1, wherein
at least a non-emission period is set between the emission period of the first light and the emission period of the third light or between the emission period of the second light and the emission period of the third light.

3. The projector of claim 1, wherein
when one of the first light and the second light is in an absence, the emission period of the other light and the emission period of the third light are alternately set in series.

4. The projector of claim 1, wherein
when the third light is in an absence, a non-emission period is set between the emission period of the first light and the emission period of the second light.

5. The projector of claim 1, wherein
each of the first optical source, the second optical source and the third optical source is constituted with an emission diode, and the first color is one of blue and green, the second color is the other of blue and green, and the third color is red.

6. The projector of claim 1, wherein
both the first optical source and the second optical source are provided on one chip.

7. The projector of claim 1, wherein
each of the first optical source and the second optical source is provided each other on a different chip.

8. The projector of claim 1, wherein
a first emission light from the first optical source and the second optical source, and a second emission light from the third optical source are located to cross with nearly ninety degrees.

9. A projector, comprising:
a first optical source fixed on a first mount substrate, the first optical source emitting a first light with first color;
a second optical source fixed on the first mount substrate being apart from the first optical source for a first distance, the second optical source emitting a second light with second color;
a third optical source fixed on a second mount substrate, the third optical source emitting a third light with a third color, an emission period of the third light being set between an emission period of the first light and an emission period of the second light;
a space optical modulation unit modulating the first light, the second light and the third light, and outputting modulated light as an image;
a first optical system introducing the first light, the second light and the third light into the space optical modulation unit; and
a second optical system projecting the image, wherein
a distance between the first optical source and the second optical source is represented by equation (1), $$d < 2 \times \sqrt{(\alpha \times T/\pi)} \qquad (1)$$

where $\alpha$ is thermal diffusion ratio between the first optical source and the second optical source, and T is the cycle.

10. The projector of claim 9, wherein
the cycle is 10 milliseconds or less than 10 milliseconds.

* * * * *